United States Patent
Larmo et al.

(10) Patent No.: US 10,129,786 B2
(45) Date of Patent: Nov. 13, 2018

(54) METHODS, ACCESS POINT AND WIRELESS DEVICE FOR COMMUNICATING DOWNLINK DATA

(71) Applicant: Telefonaktiebolaget L M Ericsson (publ), Stockholm (SE)

(72) Inventors: Anna Larmo, Espoo (FI); Parth Amin, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 14/899,465

(22) PCT Filed: Nov. 25, 2015

(86) PCT No.: PCT/SE2015/051266
§ 371 (c)(1),
(2) Date: Dec. 17, 2015

(87) PCT Pub. No.: WO2016/130064
PCT Pub. Date: Aug. 18, 2016

(65) Prior Publication Data
US 2016/0373957 A1 Dec. 22, 2016

Related U.S. Application Data

(60) Provisional application No. 62/114,210, filed on Feb. 10, 2015.

(51) Int. Cl.
*H04W 28/02* (2009.01)
*H04W 52/02* (2009.01)
(Continued)

(52) U.S. Cl.
CPC ... *H04W 28/0268* (2013.01); *H04W 52/0216* (2013.01); *H04W 72/1289* (2013.01);
(Continued)

(58) Field of Classification Search
None
See application file for complete search history.

(56) References Cited

U.S. PATENT DOCUMENTS

| | | | |
|---|---|---|---|
| 2008/0225768 A1* | 9/2008 | Wentink | H04W 52/0216 370/311 |
| 2009/0010191 A1* | 1/2009 | Wentink | H04W 52/0216 370/311 |

(Continued)

FOREIGN PATENT DOCUMENTS

| | | |
|---|---|---|
| KR | 20130139797 A | 12/2013 |
| WO | 2010057540 A1 | 5/2010 |

OTHER PUBLICATIONS

International Search Report and Written Opinion for International Patent Application No. PCT/SE2015/051266, dated May 4, 2016, 19 pages.

(Continued)

*Primary Examiner* — Chi H Pham
*Assistant Examiner* — Vladislav Y Agureyev
(74) *Attorney, Agent, or Firm* — Withrow & Terranova, PLLC

(57) ABSTRACT

An access point of a radio network, a wireless device and methods therein, for controlling a radio communication of data from the access point to the wireless device. When detecting that the number of wireless devices in a user group for which downlink data is pending exceeds the number of wireless devices that can receive downlink data during an upcoming time period reserved for the user group, the access point selects a subset of the wireless devices to which it is possible to send downlink data during the upcoming time period, and transmits a beacon indicating that the subset of the wireless devices have pending data to receive. Thereby, any unsuccessful requests transmitted from devices for (Continued)

pending data may be avoided and the risk for collision of requests may also be reduced.

32 Claims, 5 Drawing Sheets

(51) Int. Cl.
*H04W 72/12* (2009.01)
*H04W 84/12* (2009.01)

(52) U.S. Cl.
CPC .............. *H04W 84/12* (2013.01); *Y02D 70/00* (2018.01); *Y02D 70/142* (2018.01); *Y02D 70/21* (2018.01)

(56) References Cited

U.S. PATENT DOCUMENTS

| | | | |
|---|---|---|---|
| 2013/0229959 A1* | 9/2013 | Ghosh | H04W 74/08 370/311 |
| 2013/0235720 A1 | 9/2013 | Wang et al. | |
| 2014/0153464 A1 | 6/2014 | Emeott et al. | |
| 2015/0181421 A1* | 6/2015 | Cheng | H04W 12/06 455/411 |
| 2015/0181521 A1* | 6/2015 | Kwon | H04W 52/0216 370/311 |
| 2015/0223169 A1* | 8/2015 | Ghosh | H04W 52/0216 370/311 |

OTHER PUBLICATIONS

Adame, T., et al., "Capacity Analysis of IEEE 802.11ah WLANs for M2M Communications," Multiple Access Communications: Proceedings of the 6th International Workshop, MACOM 2013, Vilnius, Lithuania, Dec. 16-17, 2013 (book), vol. 8310 of the series Lecture Notes in Computer Science, 2013, Springer International Publishing, pp. 139-155.

Author Unknown, "IEEE P802.11ah™/D3.0: Draft Standard for Information technology—Telecommunications and information exchange between systems Local and metropolitan area networks—Specific requirements, Part 11: Wireless LAN Medium Access Control (MAC) and Physical layer (PHY) Specifications, Amendment 6: Sub 1 GHz License Exempt Operation," 802.11 Working Group of the LAN/MAN Standards Committee of the IEEE Computer Society, Oct. 2014, IEEE, 611 pages.

Author Unknown, "IEEE Std 802.11™-2012: IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Standards Association, Revision of IEEE Std 802.11-2007, Mar. 29, 2012, IEEE, 2,793 pages.

Lee, Jung-Ryun, et al., "An Energy-Efficient Downlink Multiple Access Control Considering Congestion in Wireless LANs," IEEE Communication Letters, vol. 10, Issue 5, May 2006, IEEE, pp. 405-407.

Partial International Search for International Patent Application No. PCT/SE2015/051266, dated Feb. 25, 2016, 7 pages.

* cited by examiner

METHODS, ACCESS POINT AND WIRELESS DEVICE FOR COMMUNICATING DOWNLINK DATA

This application is a 35 U.S.C. § 371 national phase filing of International Application No. PCT/SE2015/051266, filed Nov. 25, 2015, which claims the benefit of U.S. Provisional Application No. 62/114,210, filed Feb. 10, 2015 the disclosure of which is incorporated herein by reference in its entirety.

TECHNICAL FIELD

The present disclosure relates generally to an access point of a radio network, a wireless device and methods therein, for controlling a radio communication of data from the access point to the wireless device.

BACKGROUND

In the field of mobile or wireless communication, different types of radio networks have been developed to provide radio access for various wireless devices. The radio networks are constantly developed to meet demands from subscribers using increasingly advanced services and devices such as smartphones and tablets, which may require considerable amounts of bandwidth and resources for data transport in the networks. It is therefore of interest to improve and optimize the capacity and performance in such radio networks, e.g. by utilizing available radio resources efficiently for radio communication. Furthermore, it is desirable to reduce energy consumption in both the network and the wireless devices, as well as the amount of interference generated by transmissions made by wireless devices and access points in the network, which in turn could enhance both capacity and performance.

In this disclosure, the term "wireless device" is used to represent any communication entity capable of radio communication with a radio network by sending and receiving radio signals, such as e.g. mobile telephones, tablets, laptop computers and Machine-to-Machine, M2M, devices. Another common generic term in this field is "Station, STA" which is also sometimes used herein instead of wireless device, and the terms STA and wireless device are thus interchangeable throughout this disclosure. Further, the term "access point", is used herein to represent any node of a radio network that is operative to communicate radio signals with wireless devices. The access point discussed herein could also be referred to as a network node, base station, radio node, e-NodeB, eNB, NB, base transceiver station, etc., depending on the type of network and terminology used.

For example, multiple wireless devices may be served by an access point for receiving data which may have been accumulated in a buffer at the access point, which is referred to as "pending data" in this description.

A typical scenario is that downlink (DL) data reception requires the wireless device to first receive an indication from the network that there is pending DL data to be received, and then perform an uplink (UL) transmission such as a request for transmission or the like, prior to be able to receive that data. In order to achieve low power consumption in the wireless device, it has been suggested in the Third Generation Partnership project, 3GPP, that contention-based uplink transmission can be employed instead of requiring access reservation for each communication, thus omitting the energy-consuming access reservation process.

Some examples of how contention-based uplink transmissions can be employed are described in WO 2010057540 A1.

Contention-based uplink transmission generally means that any wireless device can transmit data or a message to an access point on a shared radio channel without reserving radio resources in advance, at the risk of collision when two or more wireless devices happen to transmit simultaneously such that the access point is not able to decode the colliding transmissions. When not transmitting, the wireless devices can enter sleep mode to save power and wake up again when it is time for next transmission. This type of contention-based scheme is employed e.g. in Wireless Local Area Network, WLAN, systems according to the standard document IEEE 802.11ah, Draft 2.0 and the mechanism of listening to the radio channel before transmitting is referred to as Carrier Sense Multiple Access, CSMA/Collision Avoidance, CA.

The embodiments and examples described herein relate to the IEEE802.11ah standard (D3.0 version) in particular but may be generalized to other wireless systems as well where downlink (DL) data reception requires the device or station (STA) to first receive an indication from the network that there is pending data to be received on the DL and then perform an uplink (UL) transmission, e.g. by sending a PS-Poll or the like, prior to be able to receive that data.

IEEE802.11ah is a new amendment to the 802.11 (2012) standard specifying wireless local area networks (WLAN), also known as Wifi. The WLAN system uses Industrial, Scientific and Medical (ISM) bands, to access the wireless medium via contention based protocols complying with different regulatory domains.

An element in the 802.11ah medium access control (MAC) protocol is the Traffic indication map (TIM) enabling the use of power save (PS) mode. Wireless devices, also referred to as TIM stations, listen to the access point (AP) transmitting beacons with indications of pending DL data, sometimes referred to as "TIM beacons" in this disclosure. At every beacon interval, the AP shall assemble a partial virtual bitmap containing the buffer status per destination for STAs in the power save mode, and the AP shall indicate the buffer status, i.e. pending data, for the STAs in the TIM field of the Beacon frame [see e.g. 10.2.1.6, 802.11]. Once an indication of pending data is received, the STA needs to reply to the AP by transmitting a PS-Poll, to indicate that the STA is available to receive the data in the DL.

STAs may operate in active mode, power save mode and automatic power save delivery mode (APSD) [see e.g. 10.2.1.9, 10.2.1.10, 10.2.1.11 in 802.11].

When operating in active mode, the STAs have their receiver activated continuously, thereby such STAs do not need to interpret the TIM elements in the beacon frame. Also, the AP will not buffer data addressed for STA operating in active mode [see e.g. 10.2.1.6 and 10.2.1.11 in 802.11].

When operating in power save mode, a STA detects that the bit corresponding to its association identifier (AID) is 1 in the TIM, and the STA shall therefore issue a PS-Poll.

For STAs operating in Automatic Power Save Delivery mode (APSD), two cases may occur as follows:
  If a scheduled single service point (SP) has been setup, the STA wakes up at its scheduled start time and the AP sends the DL data.
  If the STA is initiating an unscheduled SP, the STA wakes up and transmits a so-called trigger frame to the AP. In response thereto, the AP transmits DL data to the corresponding STA. When one or more Access Categories, ACs are not delivery-enabled, the STA may retrieve Bufferable Units, BUs using those ACs by sending PS-Poll frames to the AP.

The STAs are typically divided into groups such that the beacons with indications of pending DL data are transmitted for one group at a time. The TIM is communicated by means of a Delivery TIM (DTIM) beacon and a TIM beacon per TIM group. The DTIM beacon is sent out periodically by the AP according to a chosen period which could be in the range of 1 ms and ~60 seconds. The TIM beacons are distributed evenly throughout the DTIM period with a predefined formula [see e.g. 10.2.2.3 and 10.2.2.4 from 802.11ah draft]. There may be up to 8 TIM groups which are addressed by corresponding TIM beacons. The TIM beacon for the first TIM group may be sent together with the DTIM beacon.

An example of how DTIM and TIM beacons may be configured and transmitted by an access point over time in the above manner is illustrated in FIG. 1 involving four groups 1-4 of wireless devices or STAs. A first STA group is addressed by a TIM beacon 101a transmitted together with a DTIM beacon, followed by a TIM period 101b when the STAs in the first group can transmit a PS-poll and then receive data from the access point, before the next STA group is addressed by a next TIM beacon 102a. Thus, each TIM group is addressed by a TIM beacon 101a, 102a, 103a, 104a which are followed respective periods 101b, 102b, 103b, 104b that can be used for PS-polls and data reception by the respective STA groups. When all groups 1-4 have been addressed with TIM beacons and TIM periods, the illustrated sequence or cycle is repeated, as shown in the figure. Thus, a wireless device gets one opportunity per sequence or cycle to receive pending data provided that the wireless device manages to get a PS-Poll across to the access point after an indication of pending data in a TIM beacon.

The limited time reserved for a single TIM group clearly limits the possibilities to reach the STA in the DL. When the next TIM group begins, the STAs belonging to the previous TIM group that were not served will need to wait for their own TIM group to be addressed again by a TIM beacon and possibly resend the PS-Poll during the following period. In essence, a STA may need to send PS-Poll several times to get the DL data the AP has repeatedly indicated in the TIM beacon of the STA's group. Such unsuccessful and wasted attempts to send the PS-poll or similar naturally consumes power in vain and may also generate interference in the network.

SUMMARY

It is an object of embodiments described herein to address at least some of the problems and issues outlined above. It is possible to achieve this object and others by means of an access point, a wireless device and methods therein, as defined in the attached independent claims.

According to some aspects, a method is performed by an access point for assisting wireless devices of a user group to receive data from the access point. In this method, the access point detects that the number of wireless devices in the user group for which downlink data is pending exceeds the number of wireless devices that can receive downlink data during an upcoming time period reserved for data transmission to said user group.

In one variant, the access point selects a subset of the wireless devices to which it is possible to send downlink data during the upcoming time period, and transmits a beacon indicating that the subset of the wireless devices have pending data to receive.

In an alternative variant, the access point transmits a beacon indicating that the wireless devices in said user group have pending data to receive, and signals to the wireless devices in said user group a load indication which indicates a current load of pending data destined to the wireless devices in said user group.

According to further aspects, an access point is arranged to assist wireless devices of a user group to receive data from the access point. The access point is configured to detect that the number of wireless devices in the user group for which downlink data is pending exceeds the number of wireless devices that can receive downlink data during an upcoming time period reserved for data transmission to said user group.

In one variant, the access point is configured to select a subset of the wireless devices to which it is possible to send downlink data during the upcoming time period, and to transmit a beacon indicating that the subset of the wireless devices have pending data to receive.

In an alternative variant, the access point is configured to transmit a beacon indicating that the wireless devices in said user group have pending data to receive, and to signal to the wireless devices in said user group a load indication which indicates a current load of pending data destined to the wireless devices in said user group.

According to another aspect, a method is performed by a wireless device of a user group for receiving data from an access point. In this method the wireless device receives from the access point a beacon indicating that the wireless device has pending data to receive. The wireless device further receives from the access point a load indication which indicates a current load of pending data destined to the wireless devices in said user group, and decides whether to send a request for the pending data during an upcoming time period to the access point or wait until a later time period reserved for data transmission to the user group, based on the received load indication.

According to another aspect, a method is performed by a wireless device of a user group for receiving data from an access point. In this method the wireless device receives from the access point a beacon indicating that the wireless device has pending data to receive and that further wireless devices in the user group also have pending data to receive. In this case, the wireless device estimates a probability to be served with downlink data during an upcoming time period reserved for data transmission to the user group, based on the received beacon, and decides whether to send a request for the pending data to the access point or wait until a later time period reserved for data transmission to the user group, based on the estimated probability.

According to another aspect, a wireless device is arranged to receive data from an access point when included in a user group. The wireless device is configured to receive from the access point a beacon indicating that the wireless device has pending data to receive, and to receive from the access point a load indication which indicates a current load of pending data destined to the wireless devices in said user group. The wireless device is further configured to decide whether to send a request for the pending data during an upcoming time period to the access point or wait until a later time period reserved for data transmission to the user group, based on the received load indication.

According to another aspect, a wireless device is arranged to receive data from an access point when included in a user group. The wireless device is configured to receive from the access point a beacon indicating that the wireless device has pending data to receive and that further wireless devices in the user group also have pending data to receive, and further configured to estimate a probability to be served with downlink data during an upcoming time period reserved for data transmission to the user group, based on the received beacon. The wireless device is also configured to decide whether to send a request for the pending data to the access point or wait until a later time period reserved for data transmission to the user group, based on the estimated probability.

The above access point, wireless device and methods therein may be configured and implemented according to different optional embodiments to accomplish further features and benefits, to be described below.

A computer program is also provided comprising instructions which, when executed on at least one processor in either of the access point and the wireless device, cause the at least one processor to carry out either of the methods described above for the access point and the wireless device, respectively. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is presented herein for an improved procedure of providing downlink data to wireless devices during time periods reserved for data transmission to wireless devices of a certain user group, while reducing or even eliminating the risk for wasted transmissions and collisions when multiple wireless devices in the user group send a request for pending data during such a time period.

In this solution, it has been recognized that if the time period reserved for a user group is too short for serving all wireless devices that have pending downlink data and all these wireless devices are accordingly notified by the access point, e.g. by means of a TIM beacon, some of those devices sending requests for pending data will not be served with DL data. Thus, if all the wireless devices in the user group are informed by the access point that there is pending DL data to be received according to the above-described conventional procedures, all devices will send their requests, e.g. PS-polls, while only one or a few of them can be served with data in the upcoming time period. The devices that were not served will have to send the request again in the next time period reserved for this user group.

Figure 2:
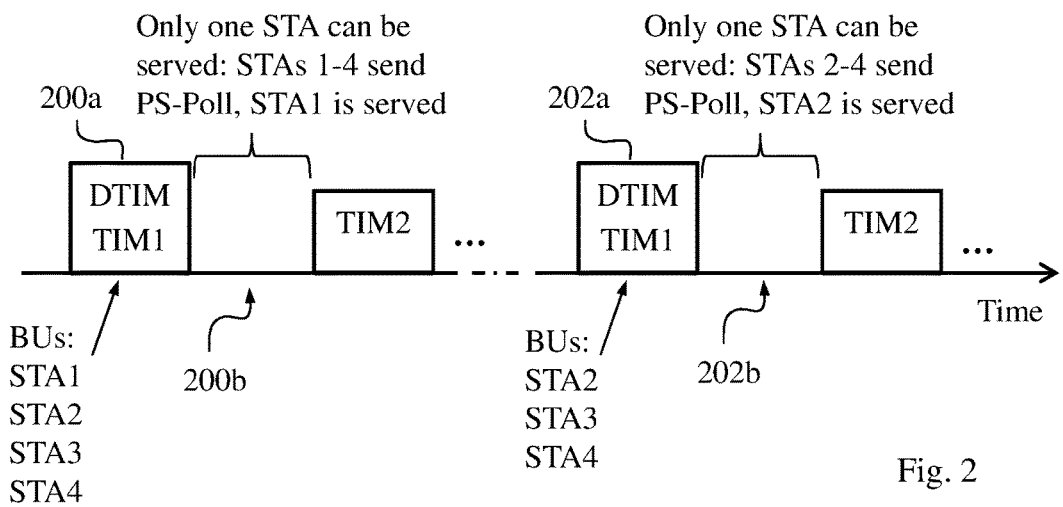
FIG. 2 is a diagram illustrating how an access point typically indicates pending downlink data in TIM beacons.

The above-described situation that would be desirable to avoid is illustrated in FIG. 2 where a TIM beacon 200a transmitted by an access point indicates that four wireless devices of a first user group, denoted STA1, STA2, STA3 and STA4, have pending data to receive. The TIM beacon 200a of the first user group thus indicates Buffered Units, BUs, for the respective devices STA1-STA4. In the following TIM period 200b for the first user group, all devices STA1-STA4 send their requests for data, denoted PS-poll, but there is only time or room in the TIM period 200b for serving one wireless device with data. In this example, only device STA1 is served with DL data in TIM period 200b and the other devices STA2-4 have to wait for the next opportunity when a next TIM beacon 202a is transmitted by the access point.

The next TIM beacon 202a indicates that the remaining three wireless devices STA2, STA3 and STA4 have pending data to receive. As a result, only device STA2 is served with DL data in the following TIM period 202b and the other devices STA3-4 have to wait for the next TIM beacon, and so forth. Thereby, several requests, or PS-polls, have been transmitted by the non-served devices to no avail which consumes battery power and may potentially cause interference and collisions. This can be avoided by preventing, or at least reducing the risk, that all wireless devices with pending data in a user group send requests for data after a TIM beacon when the number of wireless devices with pending data exceeds the number of wireless devices that can receive, i.e. be served with, data during an upcoming time period reserved for data transmission to said user group.

Figure 1:
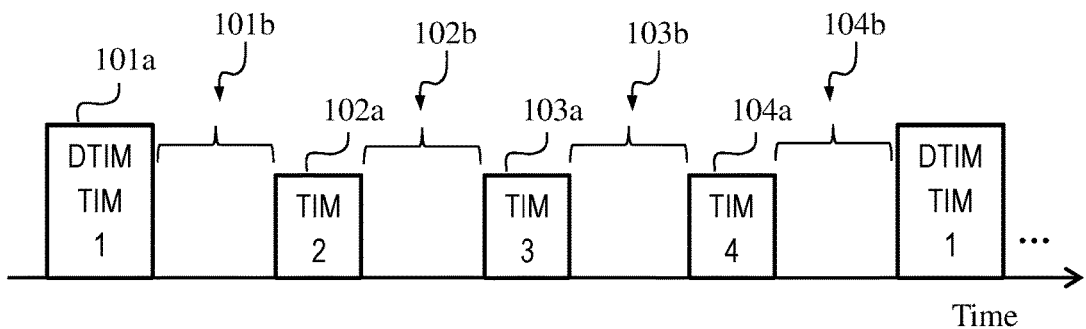
FIG. 1 is a diagram illustrating how DTIM beacons and TIM beacons can be transmitted by an access point over time, according to the prior art.

This can be achieved according to different variants of the solution which will be described below, using the exemplary terminology of TIMs and PS-polls although the solution is not limited thereto. The solution and embodiments thereof described below may be employed in a communication scenario schematically illustrated in FIG. 3 where an access point 300 has pending data to transmit to multiple wireless devices 302 of a user group. The access point 300 may transmit a DTIM beacon and multiple TIM beacons addressed to different user groups, e.g. according to the exemplary scheme shown in FIG. 1.

Figure 4:
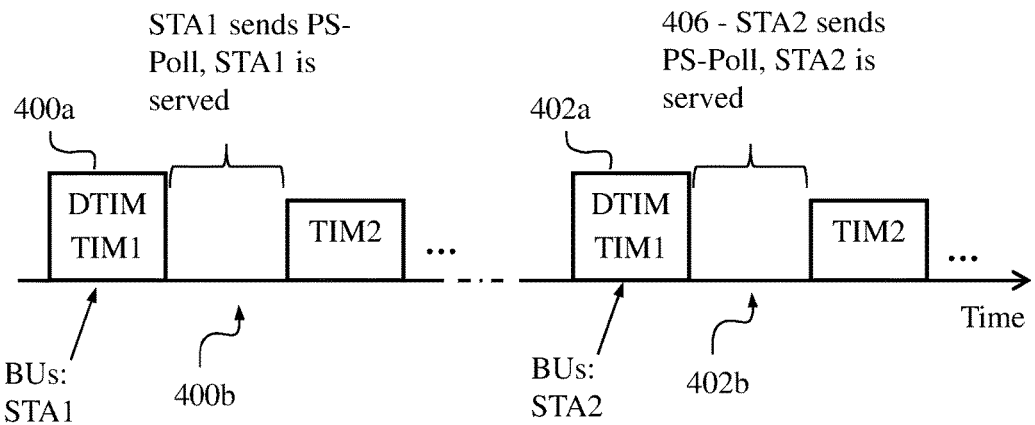
FIG. 4 is a diagram illustrating an example of how an access point may indicate pending downlink data in TIM beacons, according to some possible embodiments.

In one variant of the solution which is illustrated in FIG. 4, it is assumed that four wireless devices STA1, STA2, STA3 and STA4 of a user group have pending data to receive and the access point selects a subset of the wireless devices from the group, in this case a single device STA1. The access point then transmits a TIM beacon 400a for the user group, indicating that only the selected wireless device STA1 has pending data to receive in a following TIM period 400b while omitting the other devices STA2-4 in the TIM beacon 400a. Thereby, only the device STA1 will send a PS-poll and be accordingly served with downlink data in the following TIM period 400*b*, while the remaining devices will not send any PS-poll this time.

Then the access point transmits a next TIM beacon 402*a* for the user group, indicating that a next selected wireless device STA2 has pending data to receive in a following TIM period 402*b* while omitting the other devices STA3-4 in the TIM beacon 402*a*. Thereby, only the device STA2 will send a PS-poll and be accordingly served with downlink data in the TIM period 402*b*, and so forth.

In another variant of the solution which is illustrated in FIG. 5, it is again assumed that four wireless devices STA1, STA2, STA3 and STA4 of a user group have pending data to receive, and the access point transmits a TIM beacon 500*a* for the user group, indicating that all four wireless devices STA1, STA2, STA3 and STA4 have pending data to receive. In this case, the access point includes a load indication in the TIM beacon 500*a* which indicates a current load of pending data destined to the wireless devices in said user group. In this example, the load indication is encoded as a binary number 00 indicating a probability to be served with downlink data during the upcoming TIM period 500*b*, which is 25%, which can also be written as 0.25, in this case since one device out of four can be served. Thereby, it is statistically most likely that one device out of four, for example STA1, will send a PS-poll based on the load indication, while it is statistically likely that three devices out of four, for example STA2, STA3 and STA4 will not send any PS-poll this time based on the load indication. The device STA1 sending a PS-poll can be accordingly served with downlink data in the following TIM period 500*b*. The load indication is thus dependent on the number of devices that have pending data to receive which may be any number of the devices in the group.

Then the access point transmits a next TIM beacon 402*a* for the user group, indicating that the three remaining wireless devices STA2, STA3 and STA4 have pending data to receive in a following TIM period 402*b*, and also including a new load indication 01. In this example, the load indication 01 indicates a probability to be served with downlink data during the upcoming TIM period 502*b*, which is 33%, i.e. 0.33, in this case where one device out of three can be served in TIM period 502*b*. Thereby, one device out of three, for example STA2, is statistically likely to send a PS-poll, based on the load indication, while the remaining devices STA3 and STA4 are statistically likely to not send any PS-poll this time, and so forth. The device STA2 sending a PS-poll can be accordingly served with downlink data in the following TIM period 500*b*.

Figure 5:
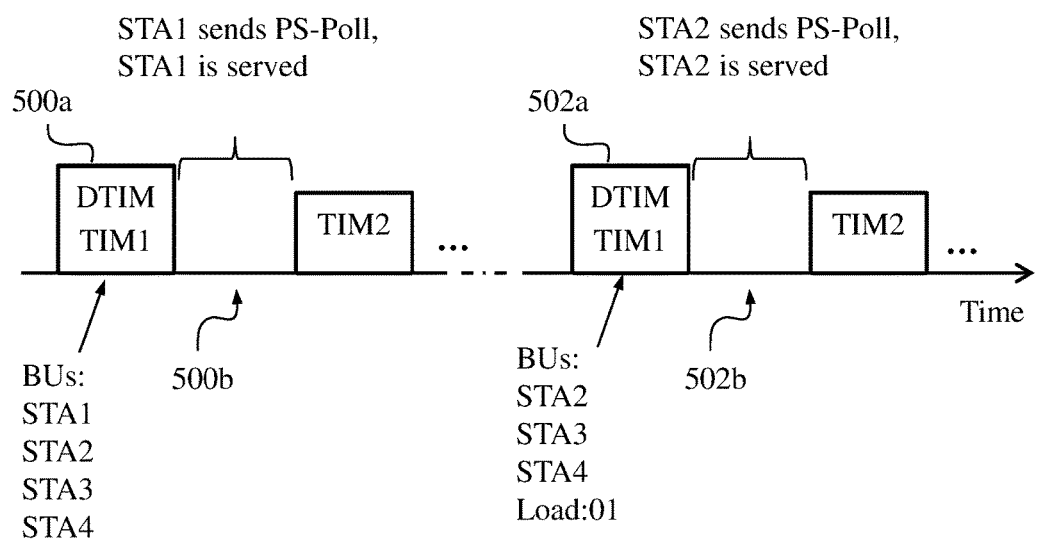
FIG. 5 is a diagram illustrating another example of how an access point may indicate pending downlink data in TIM beacons, according to further possible embodiments.

In the variant illustrated in FIG. 5, it cannot be entirely prevented that the number of wireless devices sending a PS-poll exceeds the number of wireless devices that can receive downlink data, which in this example would be more than one device sending a PS-poll, but the risk for this is at least considerably reduced as compared to the conventional procedure.

Advantages that may be attained by using the solution and embodiments described herein include:
Reduced risk that transmitted requests for data will not be served with downlink data.
Reduced system load and interference by reducing the number of transmissions of requests for data from wireless devices.
Improved energy efficiency in the wireless devices by avoiding unsuccessful transmissions of requests for data.

Figure 3:
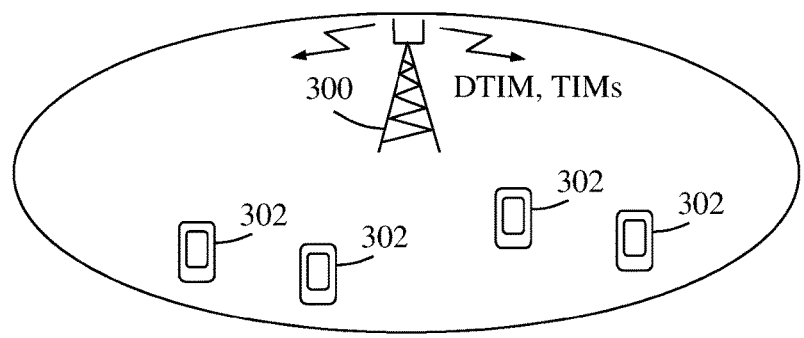
FIG. 3 is a communication scenario in which the solution can be employed.

An example of how the solution may be employed in terms of actions in a procedure performed by an access point for assisting wireless devices of a user group to receive data from the access point, will now be described with reference to the flow chart in FIG. 6, and with further reference to FIG. 3. This procedure can thus be used to accomplish the functionality and advantages described above, and some possible but non-limiting embodiments will also be described below. The procedure of FIG. 6 may thus be performed by the access point 300 when serving a user group of wireless devices 302 as illustrated in FIG. 3.

A first action 600 illustrates that the access point 300 detects that the number of wireless devices 302 in the user group for which downlink data is pending exceeds the number of wireless devices that can receive downlink data during an upcoming time period reserved for data transmission to said user group. In a next action 602, the access point 300 selects a subset of the wireless devices 302 to which it is possible to send downlink data during the upcoming time period. In some possible embodiments, the access point 300 may select the subset of wireless devices based on at least one of the following criteria:
select one or more wireless devices with the oldest pending data,
select one or more wireless devices with the smallest amount of pending data, and
select one or more wireless devices based on Quality of service requirements of the pending data. An example of this is when voice/video traffic is prioritized over non-real time traffic such as background data, browsing, file transfer.

The access point 300 then transmits a beacon indicating that the subset of the wireless devices have pending data to receive, in another action 604. Actions 602-604 thus correspond to the above-described first variant of the solution illustrated by the example in FIG. 4. Thereby, it is possible to serve all wireless devices in the selected subset that accordingly will transmit a request, e.g. PS-poll, in the upcoming time period reserved for the user group.

If the above-described second variant of the solution, illustrated by the example in FIG. 5, is employed after action 600, instead of selecting a subset that can be served the access point 300 transmits a beacon indicating that any number of the wireless devices in said user group, e.g. all of them, have pending data to receive as shown by an action 606. In addition, the access point 300 signals to the wireless devices 302 in said user group a load indication which indicates a current load of pending data destined to the wireless devices in said user group, as shown by another action 608.

Thereby, the wireless devices are able to decide whether to send a request for the pending data during an upcoming time period or wait until a later time period reserved for data transmission to the user group, based on the received load indication. When the load indication indicates a relatively high load of pending data the wireless devices are more likely to wait until a later time period, and vice versa, as explained above in the description of FIG. 5.

In some possible embodiments when actions 606-608 are performed, the access point 300 may signal the load indication as part of a TIM beacon or DTIM beacon, or as a separate broadcasted information unit. In further possible embodiments, the load indication may comprise a single bit indicating high or low load of pending data, e.g. the load indication is 1 or 0, or the load indication may comprise at least two bits indicating a probability to be served with downlink data during the upcoming time period. If at least two bits are used, it is possible to classify or grade the load indication with more accuracy. On the other hand, using just one bit minimizes the signalling of the load indication.

In another possible embodiment, the load indication may comprise a number of, i.e. indicate how many, time periods that are required for transmitting all pending data to the wireless devices in said user group. Thereby, the wireless devices are enabled to decide when they can enter sleep mode after having received all pending data in the indicated number of time periods. In another possible embodiment, the access point may also indicate a scheme of transmitting the pending data to the wireless devices in said user group, thereby enabling the wireless devices to enter sleep mode when not receiving data. In further possible embodiments, the beacon may be a TIM beacon and the upcoming time period may be a TIM interval, as in the above-described examples.

An example of how the solution may be employed in terms of actions in a procedure performed by a wireless device of a user group for receiving data from an access point, will now be described with reference to the flow chart in FIG. 7, and with further reference to FIG. 3. This procedure can thus be used to accomplish the functionality and advantages described above, and some further possible but non-limiting embodiments will also be described below. The procedure of FIG. 7 may thus be performed by one of the wireless devices 302 when being served by the access point 300 as illustrated in FIG. 3, and when the above-described second variant of the solution, illustrated by the example in FIG. 5, is employed. The procedure shown in FIG. 7 may be performed by the wireless device 302 after the access point 300 has transmitted the beacon as of action 606 in FIG. 6.

A first action 700 illustrates that the wireless device 302 receives from the access point 300 a beacon indicating that the wireless device 302 has pending data to receive. The beacon may further indicate that a plurality of the wireless devices in the user group have pending data to receive. In another action 702, the wireless device 302 also receives from the access point a load indication which indicates a current load of pending data destined to the wireless devices in said user group. The load indication may be configured or encoded according to any of the examples described above for action 608. Action 702 thus corresponds to action 608. Thus in some possible embodiments, the load indication may comprise a single bit indicating high or low load of pending data, or at least two bits indicating a probability to be served with downlink data during the upcoming time period.

The wireless device 302 then decides, in an action 704, whether to send a request for the pending data during an upcoming time period to the access point or wait until a later time period reserved for data transmission to the user group, based on the received load indication. In another possible embodiment, if the load indication indicates a probability to be served, the wireless device 302 may generate a random number and decide to send the request for the pending data to the access point if the random number is below said probability.

Another example of how the wireless device 302 may operate when the above-described second variant of the solution, illustrated by the example in FIG. 5, is employed, will now be described with reference to the flow chart in FIG. 8, and with further reference to FIG. 3. This procedure can thus be used to accomplish the functionality and advantages described above, and some further possible but non-limiting embodiments will also be described below. The procedure of FIG. 7 may thus be performed by one of the wireless devices 302 when being served by the access point 300 as illustrated in FIG. 3, and when the above-described second variant of the solution, illustrated by the example in FIG. 5, is employed. The procedure shown in FIG. 7 may be performed by the wireless device 302 after the access point 300 has transmitted the beacon as of action 606 in FIG. 6.

A first action 800 illustrates that the wireless device 302 receives from the access point a beacon indicating that the wireless device has pending data to receive and that further wireless devices in the user group also have pending data to receive. In a next action 802, the wireless device 302 estimates a probability to be served with downlink data during an upcoming time period reserved for data transmission to the user group, based on the received beacon. A final action 804 illustrates that the wireless device 302 decides whether to send a request for the pending data to the access point or wait until a later time period reserved for data transmission to the user group, based on the estimated probability. This decision may be performed as follows.

In one possible embodiment, the wireless device may generate a random number and decide to send the request for the pending data to the access point if the random number is below the estimated probability. In another possible embodiment, the wireless device may estimate said probability based on the number of wireless devices in the user group having pending data to receive and on the length of said upcoming time period.

In further possible embodiments, the length of said upcoming time period may have been obtained by any of:
  agreed during an association procedure with the access point,
  through dedicated signalling from the access point,
  through signalling in a TIM beacon or a DTIM beacon from the access point, or
  agreed in a common predefined specification.

Figure 7:
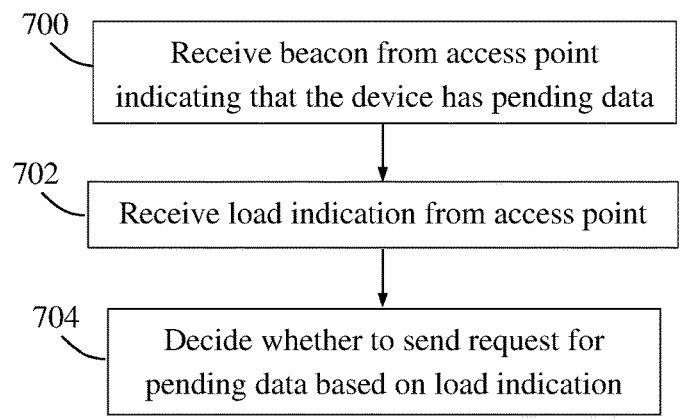
FIG. 7 is a flow chart illustrating an example of a procedure in a wireless device, according to further possible embodiments.
Figure 8:
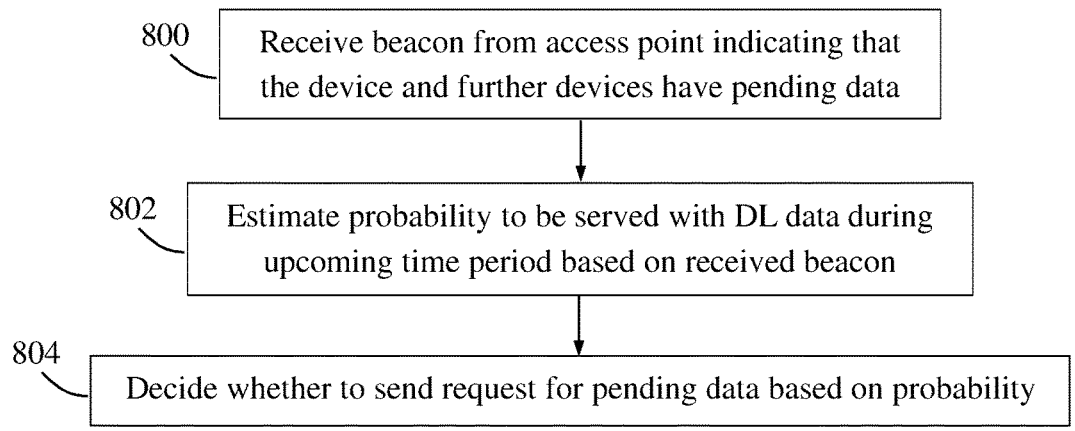
FIG. 8 is a flow chart illustrating another example of a procedure in a wireless device, according to further possible embodiments.

In another possible embodiment which is applicable in both procedures of FIGS. 7 and 8, the upcoming time period may be a TIM interval and the request for the pending data may be a PS-Poll.

Figure 9:
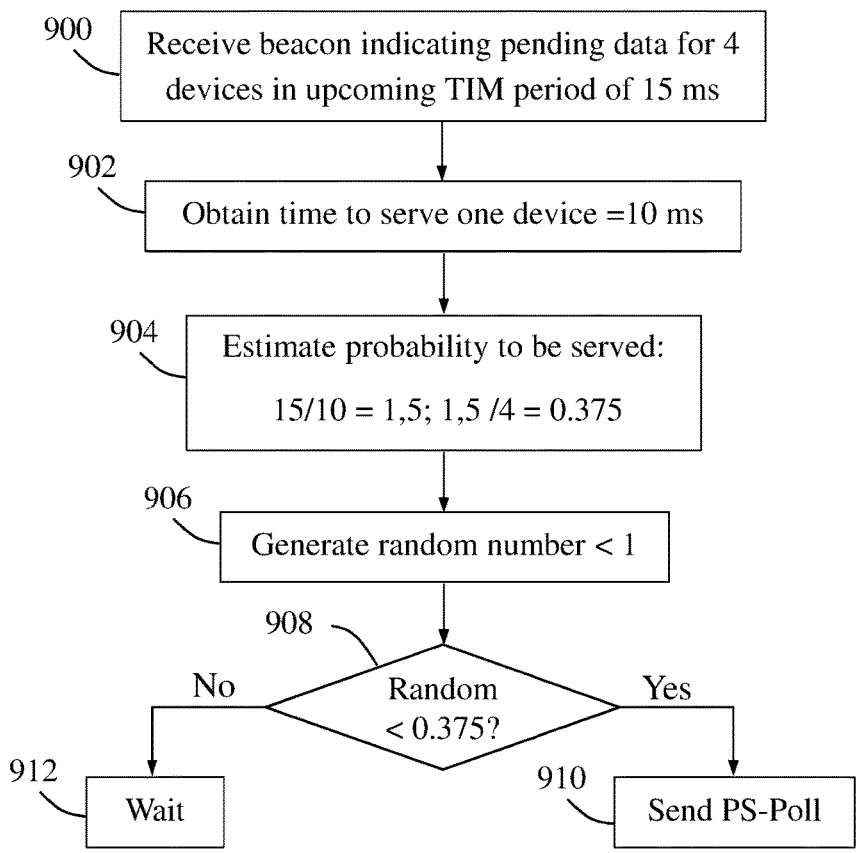
FIG. 9 is a flow chart illustrating an example of how the procedure of FIG. 8 may be performed in more detail, according to further possible embodiments.

FIG. 9 illustrates a detailed example of a procedure performed by the wireless device for making a decision in accordance with the above-described actions 802 and 804 illustrated in FIG. 8. In an action 900, the wireless device receives a beacon from the access point that indicates pending data destined to four wireless devices in an upcoming TIM period of 15 milliseconds (ms), which corresponds to an example of action 800. Action 902 illustrates that the wireless device obtains information of how much time it takes to serve one device with downlink data, which in this example is 10 ms. This information may be acquired by receiving signaling from the access point e.g. containing various system parameters.

In another action 904, the wireless device estimates the probability to be served with downlink data, which may be calculated as: 15 ms/10 ms=1.5 which is divided by the number of devices 4 so that 1.5/4=0.375 which is thus the probability to be served with downlink data in the upcoming TIM period. In another action 906, the wireless device generates a random number between 0 and 1. Actions 902-906 correspond to an example of action 802.

If the wireless device finds in a further action 908 that the generated random number between 0 and 1 is below the calculated probability 0.375, the wireless device decides to send a PS-Poll in an action 910. On the other hand, if the generated random number between 0 and 1 is not below, i.e. above, the calculated probability 0.375, the wireless device decides not to send a PS-Poll and instead waits for a later TIM period in an action 912. Actions 908-912 correspond to an example of action 804.

If the probability to be served with downlink data in the upcoming TIM period is relatively low when there are many devices with pending data, the chances that the wireless device decides to send a PS-Poll are correspondingly low since the random number between 0 and 1 is more likely to be above than below the estimated low probability to be served. As a result, less devices will be statistically likely to send a PS-Poll at high load, and vice versa.

Figure 10:
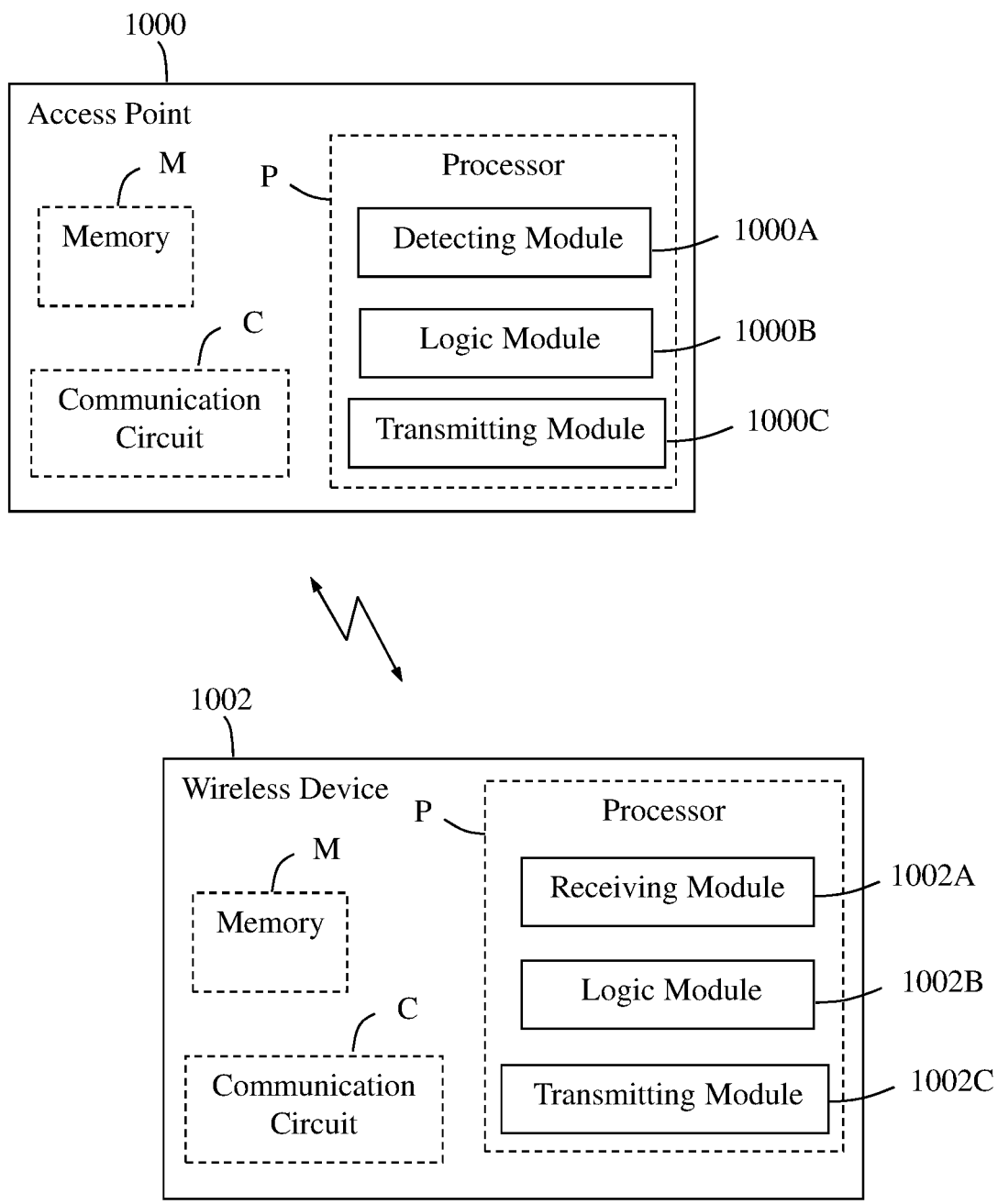
FIG. 10 is a block diagram illustrating an access point and a wireless device may be configured, according to further possible embodiments.

The block diagram in FIG. 10 illustrates a detailed but non-limiting example of how an access point 1000 and a wireless device 1002, respectively, may be structured to bring about the above-described solution and embodiments thereof. In this figure, the access point 1000 and the wireless device 1002 may be configured to operate according to any of the examples and embodiments of employing the solution as described above, where appropriate, and as follows. Each of the access point 1000 and the wireless device 1002 is shown to comprise a processor "P", a memory "M" and a communication circuit "C" with suitable equipment for transmitting and receiving information in the manner described herein.

The communication circuit C in each of the access point 1000 and the wireless device 1002 thus comprises equipment configured for communication with each other using a suitable protocol for the communication depending on the implementation. The solution is however not limited to any specific types of data or protocols.

Figure 6:
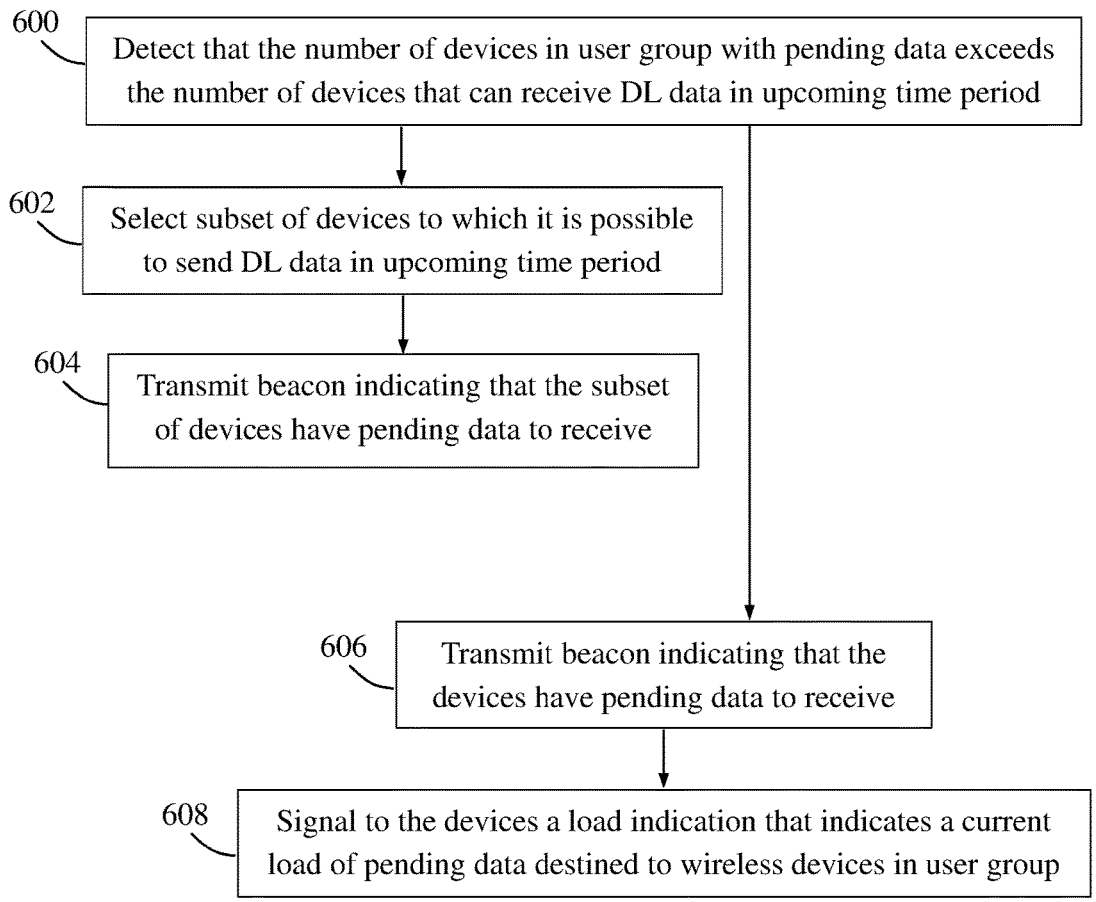
FIG. 6 is a flow chart illustrating a procedure in an access point, according to further possible embodiments.

The access point 1000 comprises means, e.g. in the form of modules or the like, configured or arranged to perform at least some of the actions of the flow chart in FIG. 6 in the manner described herein. Further, the wireless device 1002 comprises means, e.g. in the form of modules or the like, configured or arranged to perform at least some of the actions of the flow charts in FIGS. 7, 8 and 9, respectively, in the manner described above. These actions and procedures may be performed by means of functional modules in the respective processor P in the access point 1000 and the wireless device 1002 as follows.

The access point 1000 is arranged to assist wireless devices of a user group to receive data from the access point 1000. The access point 1000 is configured to detect that the number of wireless devices in the user group for which downlink data is pending exceeds the number of wireless devices that can receive downlink data during an upcoming time period, e.g. a TIM interval, reserved for data transmission to said user group. This detecting operation may be performed by a detecting module 1000a in the access point 1000, e.g. as described for action 600.

For example, the access point 1000 may also be configured to select a subset of the wireless devices to which it is possible to send downlink data during the time period reserved for said user group. This selecting operation may be performed by a logic module 1000B in the access point 1000, e.g. as described for action 602. In that case the access point 1000 may also be configured to transmit a beacon, e.g. a TIM beacon, indicating that the subset of the wireless devices have pending data to receive. This transmitting operation may be performed by a transmitting module 1000C in the access point 1000, e.g. as described for action 604.

Alternatively, instead of selecting a subset of the wireless devices, the access point 1000 may be configured to transmit a beacon, e.g. a TIM beacon, indicating that the wireless devices in said user group have pending data to receive. This transmitting operation may be performed by the transmitting module 1000C, e.g. as described for action 606. In that case, the access point 1000 may also be configured to signal to the wireless devices in said user group a load indication which indicates a current load of pending data destined to the wireless devices in said user group. This signalling operation may be performed by the transmitting module 1000C, e.g. as described for action 608.

The wireless device 1002 is arranged to receive data from the access point 1000. For example, the wireless device 1002 may be configured to receive from the access point 1000 a beacon, e.g. a TIM beacon, indicating that the wireless device has pending data to receive. This receiving operation may be performed by a receiving module 1002A in the wireless device 1002, e.g. in the manner described for action 700. The wireless device 1002 may be further configured to receive from the access point 1000 a load indication which indicates a current load of pending data destined to the wireless devices in said user group. This receiving operation may be performed by the receiving module 1002A, e.g. in the manner described for action 702.

The wireless device 1002 may be further configured to decide whether to send a request, e.g. a PS-Poll, for the pending data to the access point or wait until a later time period, e.g. TIM interval, reserved for data transmission to the user group, based on the received load indication. This deciding operation may be performed by a logic module 1002B in the wireless device 1002, e.g. in the manner described for action 704. If deciding to send the request for pending data, the wireless device 1002 may be further configured to send the request by means of a transmitting module 1002C in the wireless device 1002.

Alternatively, instead of receiving a load indication, the wireless device 1002 may be configured to receive from the access point 1000 a beacon, e.g. a TIM beacon, indicating that the wireless device has pending data to receive and that further wireless devices in the user group also have pending data to receive. This receiving operation may be performed by the receiving module 1002A, e.g. in the manner described for action 800. The wireless device 1002 may be further configured to estimate a probability to be served with downlink data during an upcoming time period, e.g. TIM interval, reserved for data transmission to the user group, based on the received beacon. This estimating operation may be performed by the logic module 1002B, e.g. in the manner described for action 802.

The wireless device 1002 may be further configured to decide whether to send a request for the pending data, e.g. a PS-Poll, to the access point or wait until a later time period, e.g. TIM interval, reserved for data transmission to the user group, based on the estimated probability. This deciding operation may be performed by the logic module 1002B, e.g. in the manner described for action 804. If deciding to send the request for pending data, the wireless device 1002 may be further configured to send the request by means of the transmitting module 1002C.

It should be noted that FIG. 10 illustrates various functional modules in the access point 1000 and the wireless device 1002, respectively, and the skilled person is able to implement these functional modules in practice using suitable software and hardware. Thus, the solution is generally not limited to the shown structures of the access point 1000 and the wireless device 1002, and the functional modules therein may be configured to operate according to any of the features and embodiments described in this disclosure, where appropriate.

The functional modules 1000A-C and 1002A-C described above can be implemented in the access point 1000 and the wireless device 1002, respectively, by means of program modules of a respective computer program comprising code means which, when run by the processor P causes the access point 1000 and the wireless device 1002 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the access point 1000 and the wireless device 1002 in the form of a memory having a computer readable medium and being connected to the processor P. The computer program product or memory M in each of the access point 1000 and the wireless device 1002 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective access point 1000 and the wireless device 1002.

The solution described herein may be implemented in each of the access point 1000 and the wireless device 1002 by a computer program comprising instructions which, when executed on at least one processor, cause the at least one processor to carry out the actions according to any of the above embodiments, where appropriate. The solution may also be implemented at each of the access point 1000 and the wireless device 1002 in a carrier containing the above computer program, wherein the carrier is one of an electronic signal, optical signal, radio signal, or computer readable storage medium.

Some further examples of how the embodiments herein may be used are described below. The IEEE802.11ah standard is frequently used below as an illustrative but non-limiting example. Further, the numerical values mentioned below are just examples and the solution is not limited to these examples.

In a loaded network employing IEEE802.11ah standard, a situation may arise where more STAs need to be served with downlink data than there is time or room for in the TIM period. An example is:

4 TIM groups,
100 STAs uniformly allocated to the TIM groups (25 STAs per group),
DTIM period of 400 ms.

The above gives an allocation of 100 ms per TIM group. This is the TIM interval that may be used to serve DL data to STAs in the current TIM group.

Further, data is received for each STA in the DL buffers so that at the time the TIM beacon is sent out, all STAs in the group have pending DL data. Further, serving the STAs with that data takes approximately 10 ms per STA. It can now be calculated that only 100/10=10 STAs at maximum may be served in a TIM interval.

A description of some further exemplary but non-limiting embodiments denoted 1-5 is presented below.

Embodiment 1

Instead of indicating that there is buffered DL data for all the STAs in a group, the AP may choose to only indicate the buffered data to a subset of STAs in that group. The subset of groups may be chosen due to different criteria. For example, the STAs with the oldest or smallest buffered units may be chosen. However, the group of STAs should be chosen such that there is a fair chance to serve all of them during the upcoming TIM interval. Furthermore, in case some of the STAs have more than one buffered unit accumulated to the DL buffer, the AP may choose not to set the more data bit in the MAC header. As the rules for setting the bits in both the TIM beacons and the more data field are governed by the 802.11 specification, a separate agreement to not set the bits in the particular deployment may be needed. Dedicated signaling may be used to agree on this between the AP and the STAs during, e.g., association signaling.

Embodiment 2

The AP conveys a load indication to the STAs as part of the DTIM or TIM beacon, or as a separate broadcast unit. This indication may consist of a single bit denoting that system load is high, or it may contain more detailed information per TIM group. For example, the probability to be served in an upcoming TIM period may be expressed with a chosen number of bits.

As an example we show a simple probability to be served with 2 bits:
00: 20% probability to be served
01: 40% probability to be served
10: 60% probability to be served
11: 80% probability to be served This probability value may be used by the STA to decide whether it should attempt to obtain the DL buffered data during the upcoming TIM period or rather wait to a lower load situation. This decision may be implemented in the STA as a simple uniform random number draw that is carried out when the indication of the DL data unit is received.

Embodiment 3

Alternatively, to avoid additional signaling at high load, the STA may estimate the probability to be served in the upcoming TIM period by reading the TIM beacon information on which other STAs have DL data buffered. As the STA already is aware of the TIM period duration, it is a simple calculation for the STA to estimate how many users may be served in the upcoming period, as long as a typical serving time is agreed on. The typical serving time may be agreed with the STA during the association procedure, through dedicated signaling, or signaling in a DTIM or TIM beacon frame, or agreed in a common specification which the STAs adhere to.

Embodiment 4

One further option is to indicate to the STAs how many TIM periods the AP estimates it will take to delivered all the currently buffered DL data. Furthermore, the AP may indicate that it will deliver the data in a certain order, thus allowing some of the STAs to sleep during the TIM periods where they will not be receiving anything. Again, this indication may be done through dedicated signaling as a unicast or broadcast to all STAs, or signaling in a DTIM or TIM beacon frame.

Embodiment 5

AP may differentiate STAs operating in active mode, power save mode and automatic power save delivery mode (APSD). AP may schedule data for STAs operating in active mode and for scheduled SPs operating in automatic power save delivery mode (APSD) as stated in 802.11. AP may delay scheduling of the data for one or more of STAs operating in power save mode or unscheduled SPs operating in automatic power save delivery mode (APSD), using one of the previous embodiments.

While the solution has been described with reference to specific exemplifying embodiments, the description is generally only intended to illustrate the inventive concept and should not be taken as limiting the scope of the solution. For example, the terms "access point", "wireless device" "user group" and "load indication" have been used throughout this disclosure, although any other corresponding entities, functions, and/or parameters could also be used having the features and characteristics described here. The solution is defined by the appended claims.

The invention claimed is:

1. A method performed by an access point for assisting wireless devices of a user group to receive data from the access point, the method comprising:
    detecting that the number of wireless devices in the user group for which downlink data is pending exceeds the number of wireless devices that can receive downlink data during an upcoming time period reserved for data transmission to said user group,
    selecting a subset of the wireless devices to which it is possible to send downlink data during the upcoming time period, and
    transmitting a beacon indicating that the subset of the wireless devices have pending data to receive.

2. A method according to claim 1, wherein the access point selects the subset of wireless devices based on at least one of the following criteria:
    select one or more wireless devices with the oldest pending data,
    select one or more wireless devices with the smallest amount of pending data, and
    select one or more wireless devices based on Quality of Service requirements of the pending data.

3. A method performed by an access point for assisting wireless devices of a user group to receive data from the access point, the method comprising:
    detecting that the number of wireless devices in the user group for which downlink data is pending exceeds the number of wireless devices that can receive downlink data during an upcoming time period reserved for data transmission to said user group,
    transmitting a beacon indicating that the wireless devices in said user group have pending data to receive, and
    signaling to the wireless devices in said user group a load indication which indicates a current load of pending data destined to the wireless devices in said user group.

4. A method according to claim 3, wherein the access point signals the load indication as part of a Traffic Indication Map, TIM, beacon or a Delivery TIM, DTIM, beacon, or as a separate broadcasted information unit.

5. A method according to claim 3, wherein the load indication comprises a single bit indicating high or low load of pending data, or at least two bits indicating a probability to be served with downlink data during the upcoming time period.

6. A method according to claim 3, wherein the load indication comprises a number of time periods required for transmitting all pending data to the wireless devices in said user group.

7. A method according to claim 6, wherein the access point indicates a scheme of transmitting the pending data to the wireless devices in said user group, thereby enabling the wireless devices to enter sleep mode when not receiving data.

8. A method according to claim 1, wherein the beacon is a Traffic Indication Map (TIM) beacon and the upcoming time period is a TIM interval.

9. An access point arranged to assist wireless devices of a user group to receive data from the access point, wherein the access point comprises:
    a processor; and
    memory containing instructions that, when executed by the processor, cause the access point to:
        detect that the number of wireless devices in the user group for which downlink data is pending exceeds the number of wireless devices that can receive downlink data during an upcoming time period reserved for data transmission to said user group,
        select a subset of the wireless devices to which it is possible to send downlink data during the upcoming time period, and
        transmit a beacon indicating that the subset of the wireless devices have pending data to receive.

10. An access point according to claim 9, wherein the access point is configured to select the subset of wireless devices based on at least one of the following criteria:
    select one or more wireless devices with the oldest pending data,
    select one or more wireless devices with the smallest amount of pending data, and
    select one or more wireless devices based on Quality of Service requirements of the pending data.

11. An access point arranged to assist wireless devices of a user group to receive data from the access point, wherein the access point comprises:
    a processor; and
    memory containing instructions that, when executed by the processor, cause the access point to:
        detect that the number of wireless devices in the user group for which downlink data is pending exceeds the number of wireless devices that can receive downlink data during an upcoming time period reserved for data transmission to said user group,
        transmit a beacon indicating that the wireless devices in said user group have pending data to receive, and
        signal to the wireless devices in said user group a load indication which indicates a current load of pending data destined to the wireless devices in said user group.

12. An access point according to claim 11, wherein the access point is configured to signal the load indication as part of a Traffic Indication Map, TIM, beacon or a Delivery TIM, DTIM, beacon, or as a separate broadcasted information unit.

13. An access point according to claim 11, wherein the load indication comprises a single bit indicating high or low load of pending data, or at least two bits indicating a probability to be served with downlink data during the upcoming time period.

14. An access point according to claim 11, wherein the load indication comprises a number of time periods required for transmitting all pending data to the wireless devices in said user group.

15. An access point according to claim 14, wherein the access point is configured to indicate a scheme of transmitting the pending data to the wireless devices in said user group, thereby enabling the wireless devices to enter sleep mode when not receiving data.

16. An access point according to claim 15, wherein the beacon is a Traffic Indication Map (TIM) beacon and the upcoming time period is a TIM interval.

17. A method performed by a wireless device of a user group for receiving data from an access point, the method comprising:
receiving from the access point a beacon indicating that the wireless device has pending data to receive,
receiving from the access point a load indication which indicates a current load of pending data destined to the wireless device in said user group, and
sending a request for the pending data during an upcoming time period to the access point or waiting until a later time period reserved for data transmission to the user group, based on the received load indication.

18. A method according to claim 17, wherein the load indication comprises a single bit indicating high or low load of pending data, or at least two bits indicating a probability to be served with downlink data during the upcoming time period.

19. A method according to claim 18, wherein the wireless device generates a random number and decides to send the request for the pending data to the access point if the random number is below said probability.

20. A method performed by a wireless device of a user group for receiving data from an access point, the method comprising:
receiving from the access point a beacon indicating that the wireless device has pending data to receive and that further wireless devices in the user group also have pending data to receive,
estimating a probability to be served with downlink data during an upcoming time period reserved for data transmission to the user group, based on the received beacon, and
sending a request for the pending data during the upcoming time period to the access point or waiting until a later time period reserved for data transmission to the user group, based on the estimated probability.

21. A method according to claim 20, wherein the wireless device generates a random number and decides to send the request for the pending data to the access point if the random number is below the estimated probability.

22. A method according to claim 20, wherein the wireless device estimates said probability based on the number of wireless devices in the user group having pending data to receive and on the length of said upcoming time period.

23. A method according to claim 22, wherein the length of said upcoming time period has been obtained by any of:
agreed during an association procedure with the access point,
through dedicated signalling from the access point,
through signalling in a Traffic Indication Map, TIM, beacon or a Delivery TIM, DTIM, beacon from the access point, or
agreed in a common predefined specification.

24. A method according to claim 17, wherein the upcoming time period is a Traffic Indication Map, TIM, interval and the request for the pending data is a Power Save, PS-Poll.

25. A wireless device, arranged to receive data from an access point when included in a user group, wherein the wireless device comprises:
a processor; and
memory containing instructions that, when executed by the processor, cause the wireless device to:
receive from the access point a beacon indicating that the wireless device has pending data to receive,
receive from the access point a load indication which indicates a current load of pending data destined to the wireless device in said user group, and
send a request for the pending data during an upcoming time period to the access point or wait until a later time period reserved for data transmission to the user group, based on the received load indication.

26. A wireless device according to claim 25, wherein the load indication comprises a single bit indicating high or low load of pending data, or at least two bits indicating a probability to be served with downlink data during the upcoming time period.

27. A wireless device according to claim 26, wherein the wireless device is configured to generate a random number and decide to send the request for the pending data to the access point if the random number is below said probability.

28. A wireless device arranged to receive data from an access point when included in a user group, wherein the wireless device comprises:
a processor; and
memory containing instructions that, when executed by the processor, cause the wireless device to:
receive from the access point a beacon indicating that the wireless device has pending data to receive and that further wireless devices in the user group also have pending data to receive,
estimate a probability to be served with downlink data during an upcoming time period reserved for data transmission to the user group, based on the received beacon, and
send a request for the pending data during the upcoming time period to the access point or wait until a later time period reserved for data transmission to the user group, based on the estimated probability.

29. A wireless device according to claim 28, wherein the wireless device is configured to generate a random number and decide to send the request for the pending data to the access point if the random number is below the estimated probability.

30. A wireless device according to claim 28, wherein the wireless device is configured to estimate said probability based on the number of wireless devices in the user group having pending data to receive and on the length of said upcoming time period.

31. A wireless device according to claim 30, wherein the length of said upcoming time period has been obtained by any of:
agreed during an association procedure with the access point,
through dedicated signalling from the access point,
through signalling in a Traffic Indication Map, TIM, beacon or a Delivery TIM, DTIM, beacon from the access point, or
agreed in a common predefined specification.

32. A wireless device according to claim 25, wherein the upcoming time period is a Traffic Indication Map, TIM, interval and the request for the pending data is a Power Save, PS-Poll.

\* \* \* \* \*